(12) United States Patent
Morton et al.

(10) Patent No.: US 7,162,831 B1
(45) Date of Patent: Jan. 16, 2007

(54) FISH BAIT SYSTEM

(76) Inventors: Timothy L. Morton, 232 Arroyo Dr., Troy, NC (US) 27371; Richard H. Hinson, 20915 Indian Mound Rd., Albemarle, NC (US) 28001

( * ) Notice: Subject to any disclaimer, the term of this patent is extended or adjusted under 35 U.S.C. 154(b) by 98 days.

(21) Appl. No.: 11/001,721

(22) Filed: Dec. 2, 2004

(51) Int. Cl.
*A01K 97/05* (2006.01)

(52) U.S. Cl. .................. 43/57; 119/226; 119/259; 119/261; 119/263; 210/169; 261/121.2

(58) Field of Classification Search .......... 43/57, 43/56; 119/226, 227, 245, 259–261, 263; 210/169; 261/121.2, 121.1
See application file for complete search history.

(56) References Cited

U.S. PATENT DOCUMENTS

| | | | | |
|---|---|---|---|---|
| 880,783 | A * | 3/1908 | Erlwein et al. | 119/261 |
| 950,999 | A * | 3/1910 | Erlwein et al. | 119/263 |
| 2,137,397 | A * | 11/1938 | Haideman | 43/57 |
| 2,552,261 | A * | 5/1951 | Coughlin | 43/57 |
| 2,863,653 | A * | 12/1958 | Cummings | 261/121.1 |
| 2,865,618 | A * | 12/1958 | Abell | 43/57 |
| 3,149,608 | A * | 9/1964 | Murphy | 119/261 |
| 3,189,334 | A * | 6/1965 | Bell | 43/57 |
| 3,365,178 | A * | 1/1968 | Bood | 261/121.1 |
| 3,449,855 | A * | 6/1969 | Hassel | 43/56 |
| 3,513,978 | A * | 5/1970 | Newsteder | 210/169 |
| 3,540,593 | A * | 11/1970 | Stewart | 210/169 |
| 3,550,917 | A * | 12/1970 | Cochran | 261/121.1 |
| 3,640,516 | A * | 2/1972 | Willinger | 43/57 |
| 3,738,620 | A * | 6/1973 | Ennis | 261/121.1 |
| 3,904,393 | A * | 9/1975 | Morse | 210/169 |
| 4,064,837 | A * | 12/1977 | Montgomery | 119/261 |
| 4,162,681 | A * | 7/1979 | Patterson | 210/169 |
| 4,265,751 | A * | 5/1981 | Willinger | 210/169 |
| 4,483,769 | A * | 11/1984 | Sherman | 210/169 |
| 4,522,151 | A * | 6/1985 | Arbisi et al. | 119/263 |
| 4,606,821 | A * | 8/1986 | D'Imperio | 210/169 |
| 4,615,137 | A * | 10/1986 | Radmanovich | 43/57 |
| 4,728,420 | A * | 3/1988 | Abercia, Jr. | 210/169 |

(Continued)

FOREIGN PATENT DOCUMENTS

EP           552594 A1 *   7/1993           119/245

(Continued)

OTHER PUBLICATIONS

Three page printout from webpage of Master Flow Bait Systems; dated 2003.

(Continued)

*Primary Examiner*—Darren W. Ark (57) ABSTRACT

A fish bait system includes a fish compartment and a filter compartment for maintaining bait fish in a healthy condition for prolonged periods prior to use. The fish bait system allows water to be pumped from the fish compartment through a filter having a standard non-woven reusable media whereby the filtered water is returned through an air infuser to the fish compartment. The infuser is mounted on the wall separating the fish and filter compartments and saturates the filtered water with oxygen to insure the fish are provided with an adequate oxygen supply. The removable filter media can be easily extracted from the filter housing, rinsed or replaced and returned to the filter in a quick and efficient manner.

9 Claims, 12 Drawing Sheets

U.S. PATENT DOCUMENTS

| | | | | |
|---|---|---|---|---|
| 4,927,568 | A * | 5/1990 | Campau | 119/263 |
| 4,936,043 | A * | 6/1990 | Steele | 43/57 |
| 4,994,177 | A * | 2/1991 | Bogar, Jr. | 43/57 |
| 5,053,125 | A * | 10/1991 | Willinger et al. | 210/169 |
| 5,054,423 | A * | 10/1991 | Escobal | 119/263 |
| 5,077,932 | A * | 1/1992 | Hetherington | 43/57 |
| 5,088,229 | A * | 2/1992 | Andrews | 43/57 |
| 5,138,975 | A * | 8/1992 | Walsh | 43/56 |
| 5,171,438 | A * | 12/1992 | Korcz | 210/169 |
| 5,172,511 | A * | 12/1992 | Smith et al. | 43/56 |
| 5,193,301 | A * | 3/1993 | Figgins | 43/57 |
| 5,231,789 | A * | 8/1993 | Radmanovich | 43/57 |
| 5,256,282 | A * | 10/1993 | Chang et al. | 210/169 |
| 5,277,800 | A * | 1/1994 | Dieckmann et al. | 210/169 |
| 5,305,544 | A * | 4/1994 | Testa, Jr. | 43/57 |
| 5,306,421 | A * | 4/1994 | Weinstein | 210/169 |
| 5,406,740 | A * | 4/1995 | Wilkin | 43/56 |
| 5,453,182 | A * | 9/1995 | Kikuta | 210/169 |
| 5,558,042 | A * | 9/1996 | Bradley et al. | 119/226 |
| 5,582,777 | A * | 12/1996 | Vento | 261/121.2 |
| 5,585,010 | A * | 12/1996 | Dockery et al. | 210/169 |
| 5,632,220 | A * | 5/1997 | Vento | 43/57 |
| 5,676,889 | A * | 10/1997 | Belgin | 43/57 |
| 5,799,435 | A * | 9/1998 | Stafford | 43/57 |
| 5,822,916 | A * | 10/1998 | Power | 43/57 |
| 5,901,663 | A * | 5/1999 | Reinke | 119/259 |
| D449,368 | S   | 10/2001 | Gray | D22/136 |
| 6,394,423 | B1 * | 5/2002 | Vento | 261/121.2 |
| 6,442,888 | B1 * | 9/2002 | Morrow | 43/57 |
| 6,729,066 | B1 * | 5/2004 | Howley | 43/57 |
| 6,748,695 | B1 * | 6/2004 | Vento | 43/57 |
| 6,836,998 | B1 * | 1/2005 | Rucker | 43/57 |
| 6,962,019 | B1 * | 11/2005 | McDougle | 43/57 |
| 7,024,814 | B1 * | 4/2006 | McDougle | 43/57 |

FOREIGN PATENT DOCUMENTS

| | | | | |
|---|---|---|---|---|
| JP | 63-310614 A | * | 12/1988 | 11/226 |
| JP | 2-171128 A | * | 7/1990 | 119/226 |
| JP | 3-146105 A | * | 6/1991 | 210/169 |
| JP | 5-56735 A | * | 3/1993 | 43/55 |
| JP | 10-215746 A | * | 8/1998 | |
| JP | 2001-148961 A | * | 6/2001 | |

OTHER PUBLICATIONS

Two page printout of Super Bait Tanks by Livewell Systems, Inc.; undated.

Two page printout from Kodiak Marine Products of Pro Flow Bait Tanks; undated.

Three page printout from Grayline Bait Tanks.CC; undated.

Two page printout form Let 'em Live by Dannco; aerators; undated.

Drawing of prior art air infusor.

* cited by examiner

FISH BAIT SYSTEM

FIELD OF THE INVENTION

The invention herein pertains to tanks for maintaining live fish for use as bait and particularly pertains to a bait system having a fish compartment which is segregated from a water filtering compartment.

DESCRIPTION OF THE PRIOR ART AND OBJECTIVES OF THE INVENTION

In recent years fishing has become a very popular sport with tournaments held throughout the world. Tournaments offer winners in various categories enormous prizes consisting of money and merchandise. In order to effectively compete contestants are often required to utilize fresh bait and accordingly transport a bait system on their boats during the contest. In order to maintain the fish in a healthy, live condition bait tanks are used which filter and oxygenate the water supply. Otherwise the bait fish can quickly die reducing the contestants' chances of winning the prizes offered.

Prior bait tanks utilize various types of filters which have to be frequently cleaned in order to maintain the fish therein. Certain of the standard filters require a pressurized stream of water for proper cleaning. Cleaning the usual filters is a common occurrence as the water usually flows vertically through the filter causing frequent clogging which is worrisome and often costly to fishing contestants.

In view of the problems and disadvantages of conventional fish bait tanks and systems, the present invention was conceived and one of its objectives is to provide a fish bait system with a water filter which is efficient and durable.

It is another objective of the present invention to provide a fish bait system which will contain fish in a healthy, live condition for long periods of time.

It is still another objective of the present invention to provide a fish bait system with a filter which includes removable media which can be quickly extracted, easily cleaned and replaced.

It is yet another objective of the present invention to provide a fish bait system having a water filter which includes a sediment chamber for collecting debris to prevent the filter media from clogging.

It is still yet another objective of the present invention to provide an air infuser which provides a means for infusion of oxygen into the filtered water to help maintain the bait fish in a healthy condition.

Various other objectives and advantages of the present invention will become apparent to those skilled in the art as a more detailed description is set forth below.

SUMMARY OF THE INVENTION

The aforesaid and other objectives are realized by providing a fish bait system which includes a tank formed from a conventional polymeric material, such as polycarbonate or other suitable materials. A fish compartment and a filter compartment are contained within the tank with a wall therebetween. Apertures within the wall allow communication between the fish compartment and the filter compartment whereby a conventional submergible electric pump can be used to displace water from the fish compartment through a vertical water filter in the filter compartment and thereafter return the filtered water to the fish compartment infused with oxygen. The filter is positioned in a vertical fashion for lateral (horizontal) water flow therethrough and includes a housing having a water inlet along the bottom. As water enters the filter it encounters non-woven fibrous filter media through which it laterally passes and then exits through the back of the filter. A front sediment chamber is positioned contiguous the filter media for receiving relatively large debris. The sediment chamber helps protect the filter media from quickly clogging during use. An oxygen infuser is positioned on the wall between the filter compartment and the fish compartment in the fish compartment whereby filtered water passes therethrough and receives oxygen by venturi action. The oxygenated water thus exits the infuser and enters the fish compartment to supply the fish with fresh oxygenated water and aiding in the removal of harmful gases as the air bubbles float to the surface. The directional flow of the oxygenated water exiting the air infuser induces a current in the fish compartment to help the fish swim in a direction to avoid collisions.

DETAILED DESCRIPTION OF THE PREFERRED EMBODIMENT AND OPERATION OF THE INVENTION

Figure 1:
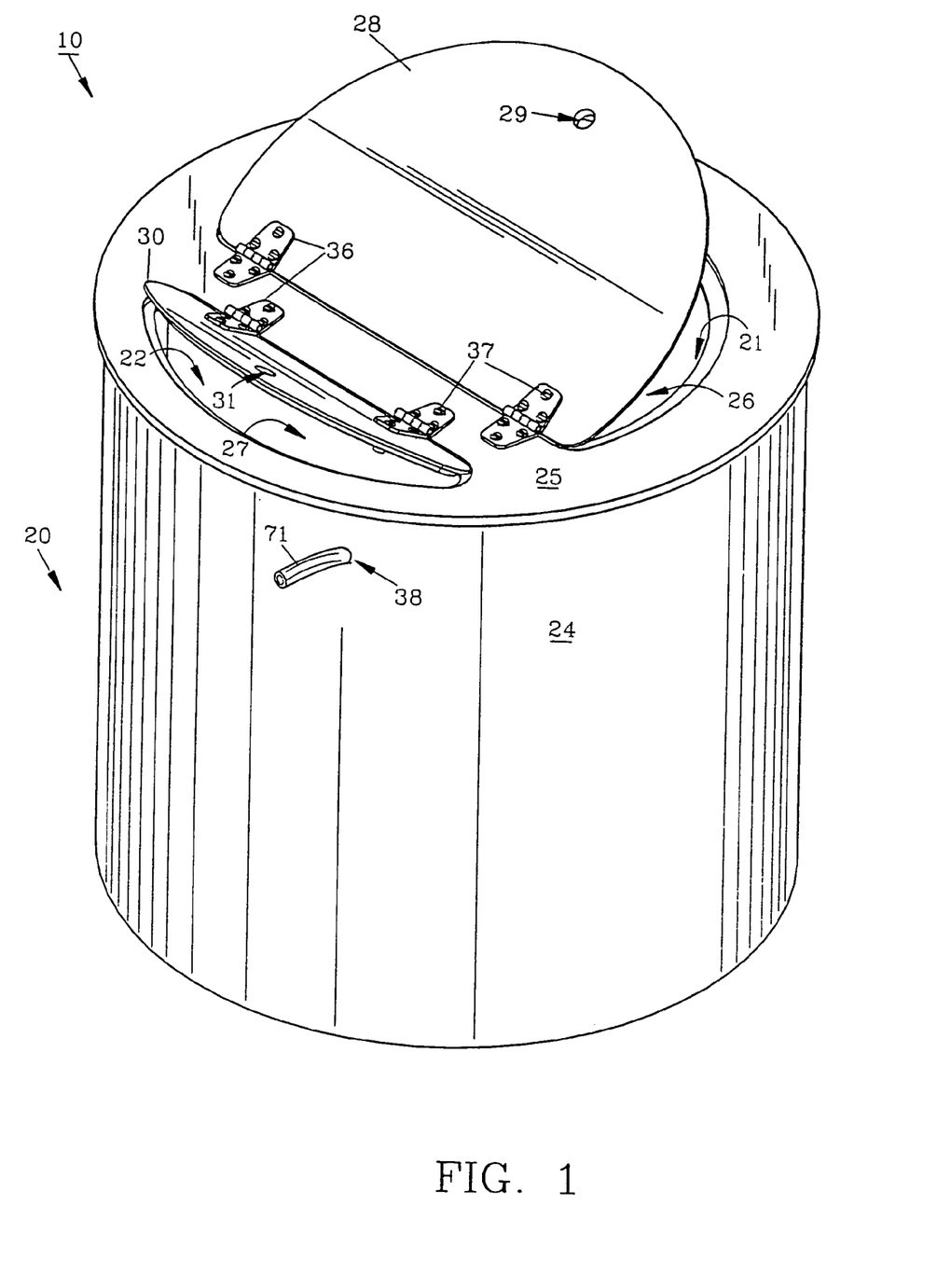
FIG. 1 shows a perspective view of the preferred fish bait system of the invention.
Figure 2:
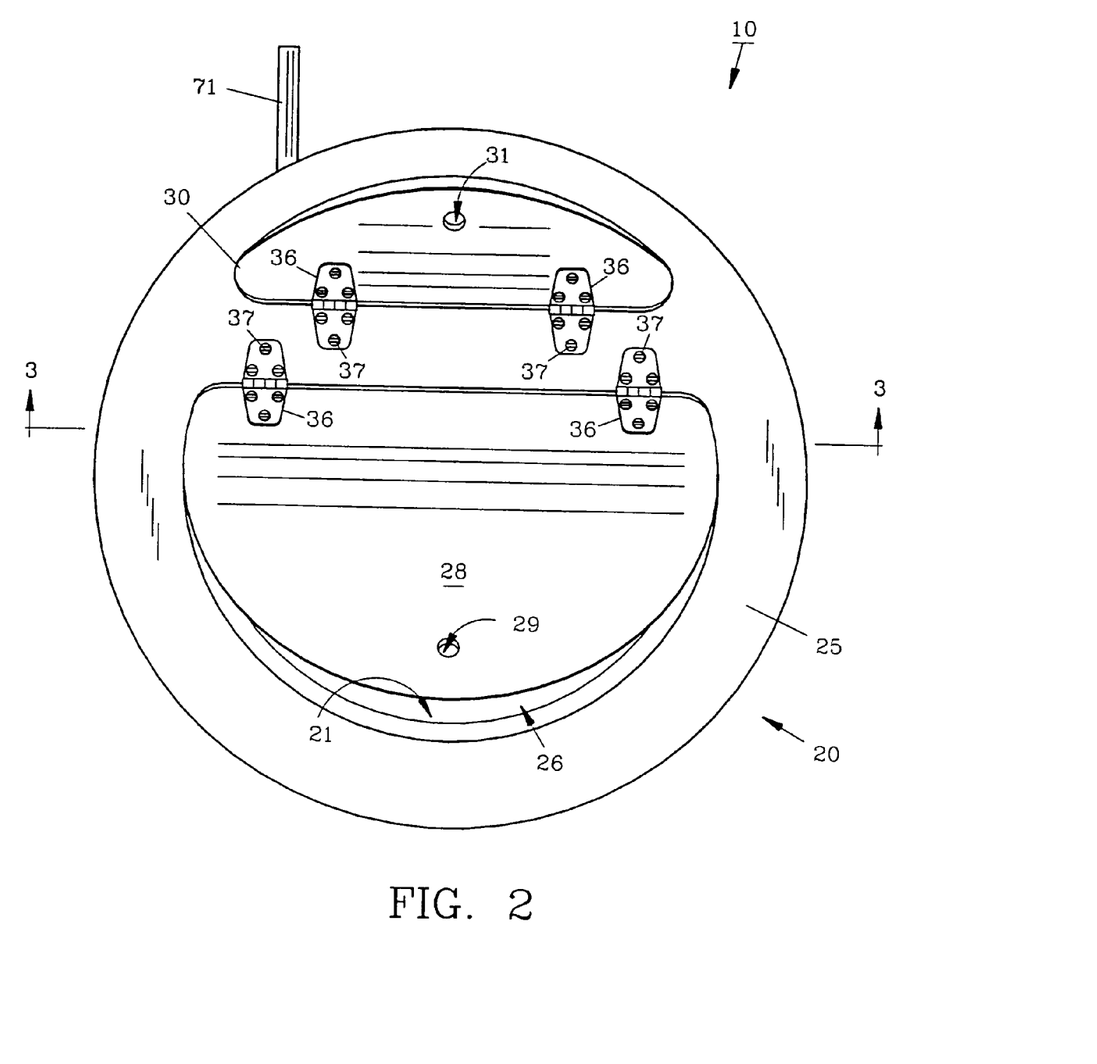
FIG. 2 features a top plan view of the fish bait system shown in FIG. 1.
Figure 3:
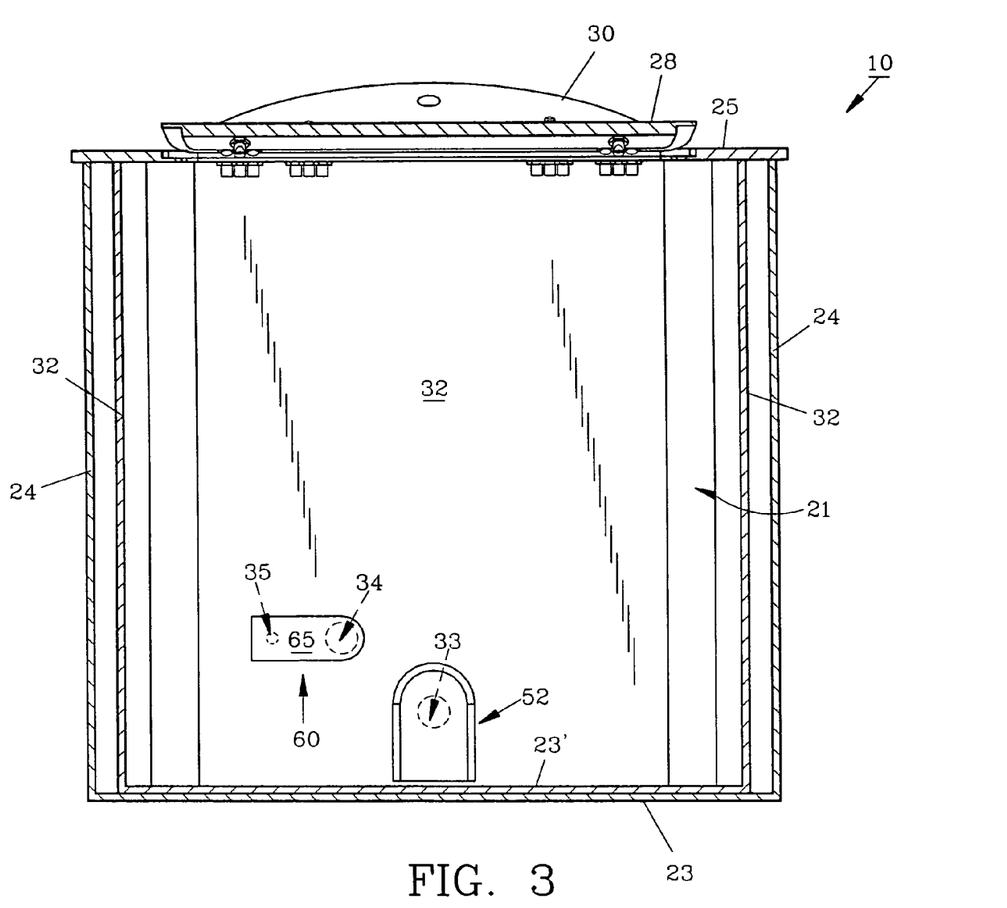
FIG. 3 illustrates a cross-sectional view of the fish bait system shown in FIG. 2 along lines 3—3.
Figure 4:
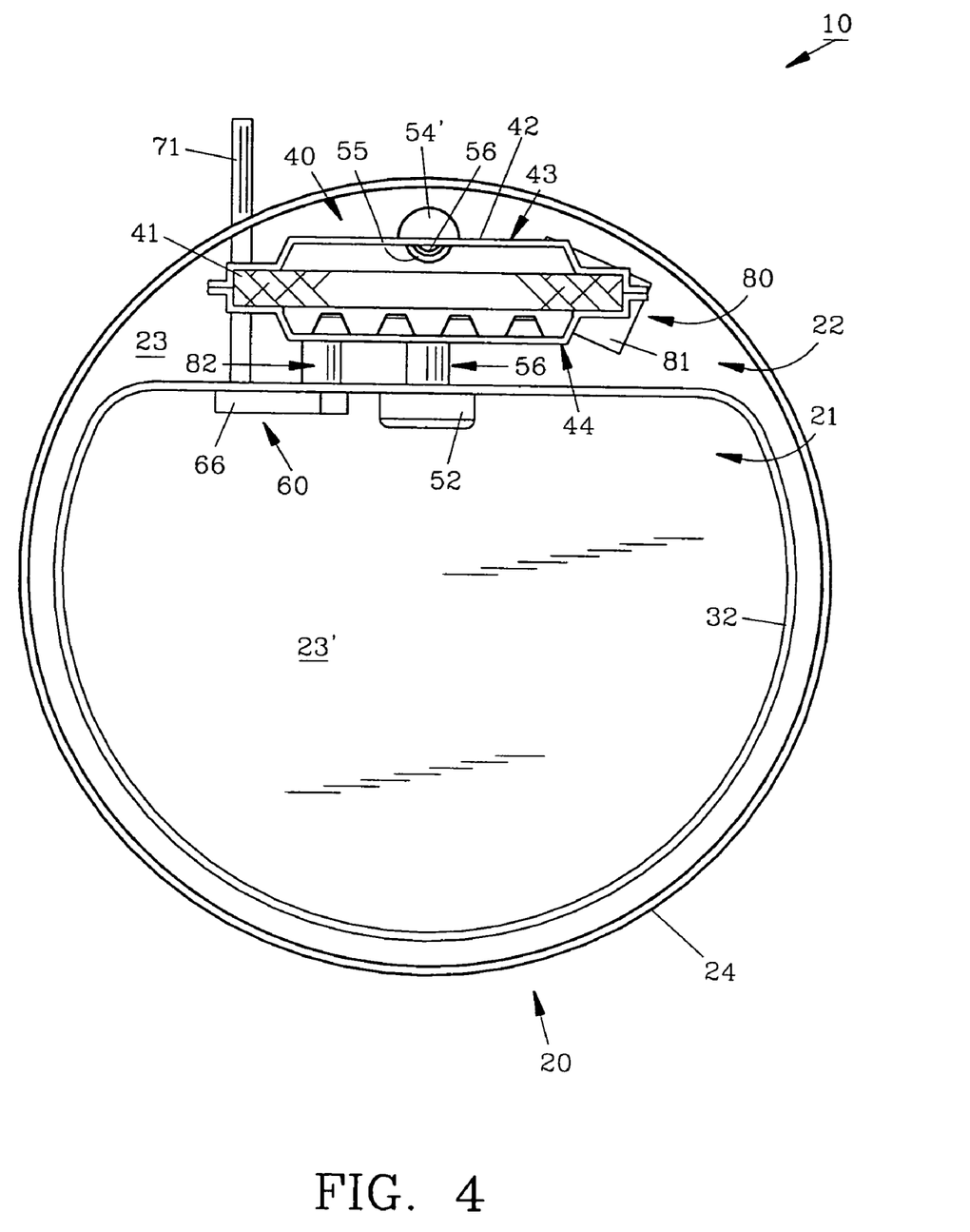
FIG. 4 demonstrates the fish bait system of FIG. 2 with the top removed therefrom.

For a better understanding of the invention and its operation, turning now to the drawings, FIG. 1 shows preferred fish bait system 10 in perspective view having tank 20 with two (2) compartments therein, fish compartment 21 and filter compartment 22, separated from one another by internal common wall 32 as seen in FIG. 4. Tank 20 is cylindrically shaped and formed from a rigid polymeric material such as a polycarbonate comprising side 24, top 25 and base 23 seen in FIG. 3. Top 25 is parallel to base 23 and as shown in FIG. 1 defines openings 26, 27 having respectively doors 28, 30 pivotally affixed thereto for accessing fish compartment 21 and filter compartment 22. Doors 28, 30 are formed from the same rigid polymeric material as tank 20 and include finger holes 29, 31 respectively for opening the same. Doors 28, 30 are each affixed to top 25 by a pair of conventional metal hinges 36 and conventional threaded fasteners 37. Doors 28, 30 also include edge recesses which mate with the corresponding recesses along openings 26, 27 of top 25 for flush engagement therewith.

Fish compartment 21 shown in FIG. 3, is contained in tank 20 and defined by wall 32 joined to base 23'. Base 23' is positioned contiguous and parallel to base 23 while wall 32 and side 24 are each vertically aligned and spaced from one another. Wall 32 defines first aperture 33, second aperture 34 and third aperture 35. First aperture 33 allows for communication between water backflow cover 52 and filter compartment 22 by L-shaped pipe 56 (FIG. 4), whereby second and third apertures 34, 35 are provided for communication between air infuser 60 with tube 71 and hose 82 as also seen in FIG. 4.

In FIG. 4 tank 20 is seen with the top removed illustrating filter compartment 22 which contains pump apparatus 80 and filter 40. Pump apparatus 80 includes pump 81, a conventional submergible 12v electric bilge pump rated at 800 gph (manufactured by Rule Industries, Inc. of Burlington, Mass.). Pump 81 is in electrical communication with a power source such as a battery (not shown) by conventional electrical wires and connectors (also not shown). Pump 81 is joined to hose 82, a conventional flexible polymeric hose rigidly maintained in second aperture 34 (FIG. 3) by common plumbing fittings (not shown) by threaded or adhesive engagement. Through hose 82 pump apparatus 80 delivers filtered water from filter compartment 22 into air infuser 60 which is infused with oxygen through tube 71 contained within third aperture 35 prior to release into fish compartment 21. Pump apparatus 80 maintains a water level (not shown) in fish compartment 21 above the top of L-shaped pipe 56 in filter compartment 22 for gravity displacement of water into filter 40. The water height differential is preferably six (6) inches (15.2 cm). Tube 71 is preferably formed from clear polyvinyl chloride and extends through portal 38 in side 24 as seen in FIG. 1 as an oxygen source for air infuser 60.

Figure 10:
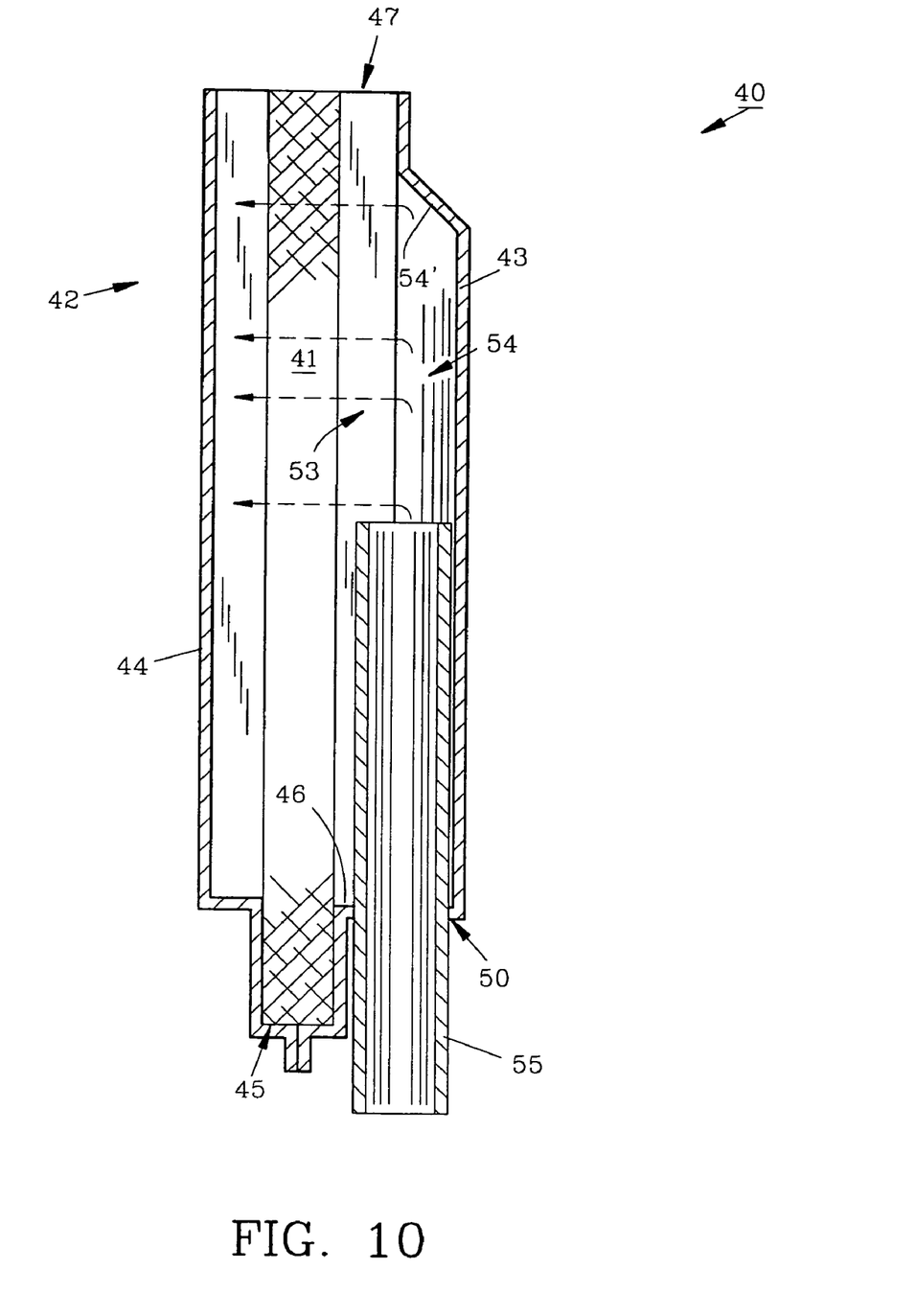
FIG. 10 pictures a cross-sectional view of the filter as seen in FIG. 9, along lines 10—10.

As further seen in FIG. 4, filter 40 is vertically oriented within filter compartment 22 and includes filter media 41 received in housing 42. Filter 40 allows for substantially lateral (horizontal) water flow through filter media 41 (FIG. 10). Housing 42 comprises front 43 and back 44 joined along their respective flanges 43', 44' (FIG. 5) thus forming unshaped channel 45 therearound and open top 47. Filter media 41 is common non-woven fibrous polymeric material as often used in filtering and has a rectangular shape that fits flush within channel 45. Filter media 41 is readily accessible through door 30 facilitating quick cleaning or replacement thereof.

Figure 6:
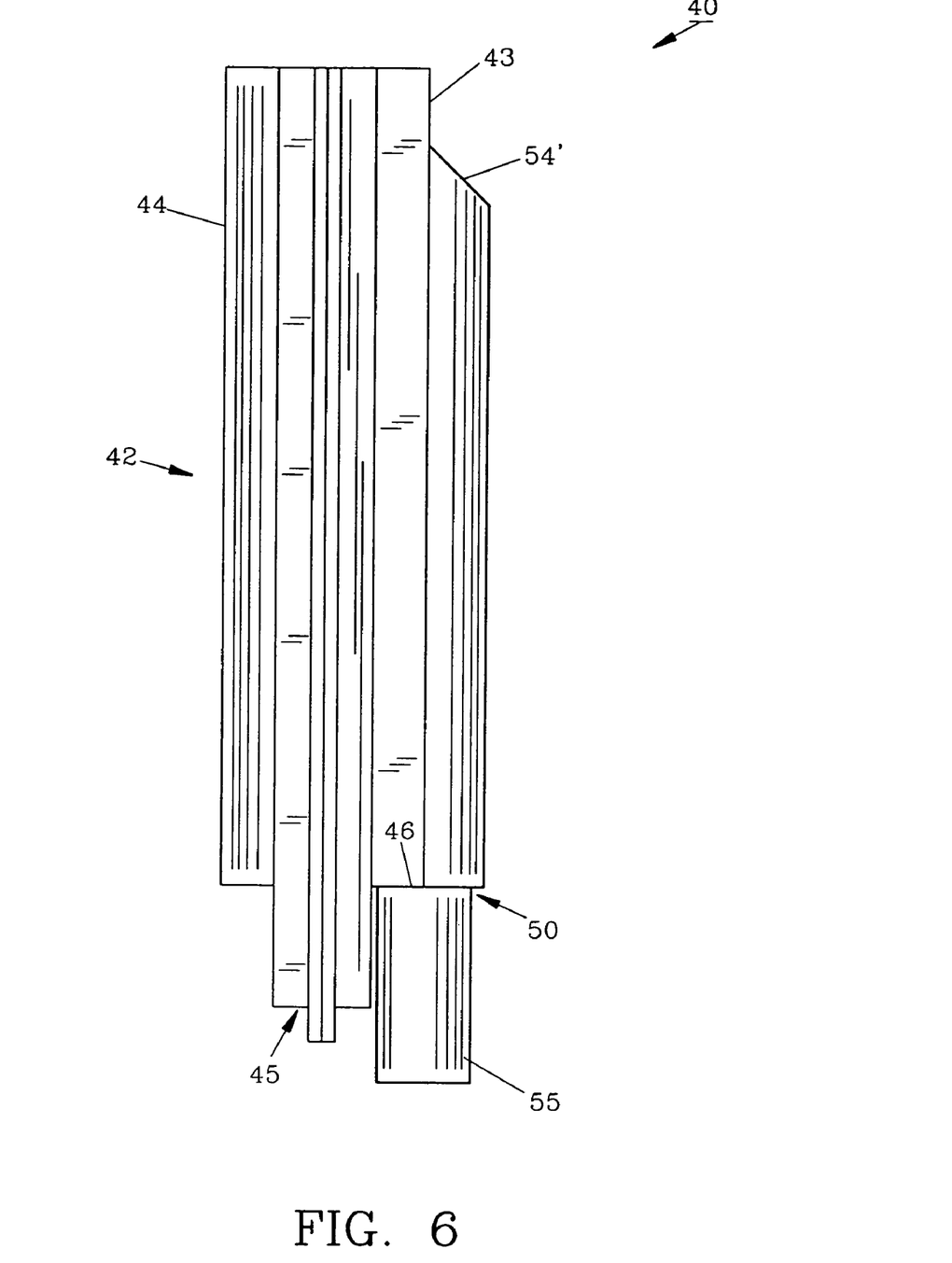
FIG. 6 pictures a left side elevational view of the preferred filter as removed from the tank, the right side elevational view being a mirror image thereof.
Figure 7:
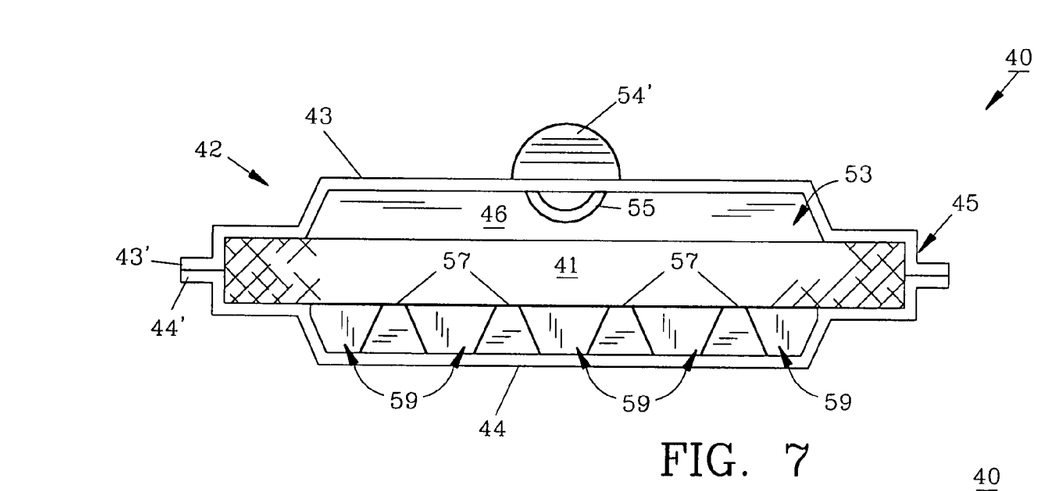
FIG. 7 shows a top plan view of the filter as seen in FIG. 6.
Figure 8:
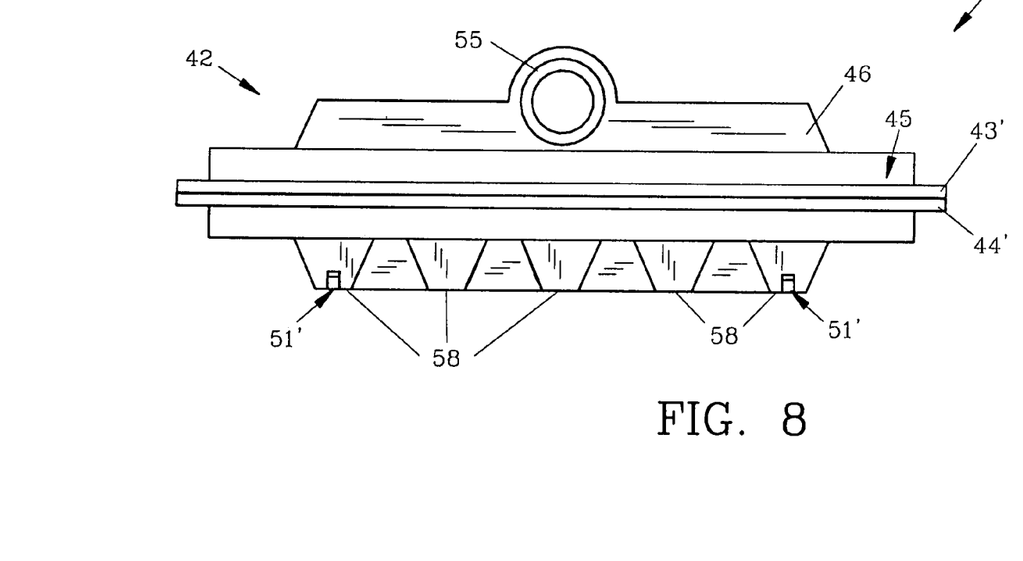
FIG. 8 pictures bottom plan view of the filter as seen in FIG. 6.
Figure 9:
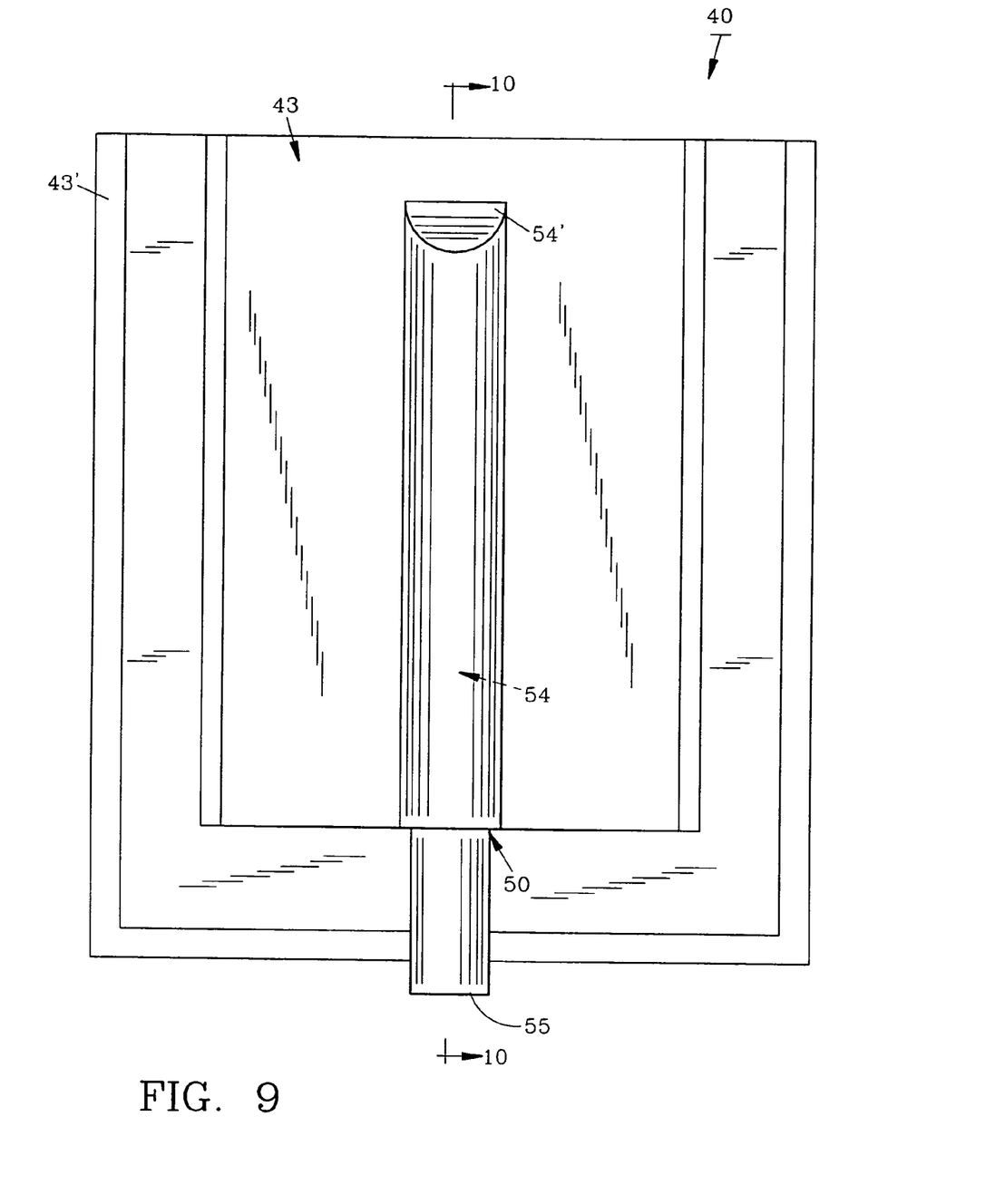
FIG. 9 illustrates a front elevational view of the filter shown in FIG. 6.

As seen in FIGS. 6, 9 and 10, front 43 defines vertical semicircular channel 54 terminating therein at angularly disposed planar face 54' for redirecting the water flow (see arrows in FIG. 10) towards filter media 41. Channel 54 extends from inlet 50 defined in bottom 46 of front 43 as shown in FIGS. 7, 8 and 10. In FIGS. 9 and 10, cylindrical mounting stud 55 is shown within channel 54 with one end extending below inlet 50 and the other end spaced below face 54'. Mounting stud 55 is formed from conventional 1¼" (3.18 cm) diameter PVC pipe and receives the long leg of L-shaped pipe 56 (FIG. 4) therein. Housing 42 further comprises sediment chamber 53 as seen in FIGS. 7 and 10 along the interfacing surfaces of channel 45, filter media 41, mounting stud 55 and front 43. Bottom 46 seen in FIG. 8 is angularly disposed from the vertical so gravity causes debris (not shown) carried by the water into filter 40 (through L-shaped pipe 56 and mounting stud 55) to settle and remain in sediment chamber 53, rather than clogging filter media 41 and reducing the filtering capacity thereof.

Figure 5:
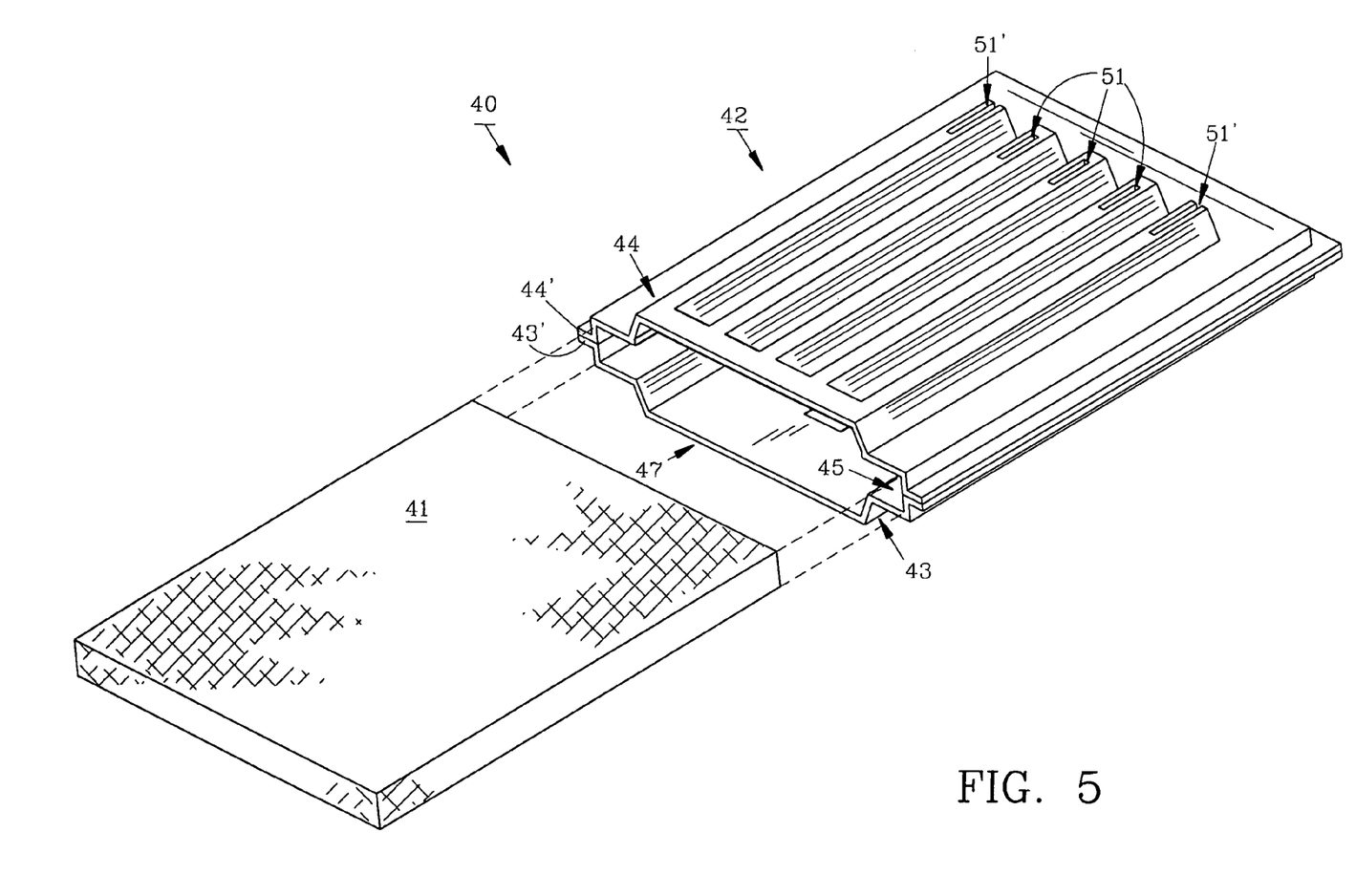
FIG. 5 depicts a rear perspective view of the filter as removed from the tank and with the filter media exploded therefrom.

Back 44 seen in FIGS. 5, 7 and 8 defines a sinusoidal surface with plurality of peaks 57 and a plurality of valleys 58. Filter 40 preferably comprises four (4) peaks 57 and five (5) valleys 58 as shown in FIGS. 7 and 8 with L-shaped outlets 51' positioned at the lower ends of the first ($1^{st}$) and fifth ($5^{th}$) valleys 58 (FIG. 8) while straight outlets 51 are positioned at the lower ends of the second ($2^{nd}$), third ($3^{rd}$) and fourth ($4^{th}$) valleys 58 (FIG. 5). The lower end of each valley 58 is contiguous bottom 46. The plurality of peaks 57 maintain filter media 41 spaced from outlets 51, 51' while filtered water (not shown) passing through filter media 41 can collect in the plurality of outlet channels 59 (FIG. 7) defined between peaks 57 (FIG. 7) and valleys 58 (FIG. 8) along filter media 41 contained in housing 42.

In FIG. 3, fish compartment 21 shows backflow cover 52 and air infuser 60, which is the preferred means to infuse oxygen into the water. Backflow cover 52 defines a plurality of slits (not shown) positioned contiguous base 23' of fish compartment 21 for controlling the flow of water to filter 40 through first aperture 33 while reducing the likelihood of trapping fish (not shown) therein. Pipe 56 (FIG. 4) is a conventional 1" (2.54 cm) diameter PVC plumbing pipe configured in an L-shape and positioned in filter compartment 22. The shorter leg of L-shaped pipe 56 is affixed in first aperture 33 as usual for communication with backflow cover 52 in fish compartment 21 as shown in FIGS. 3 and 4 while the longer leg thereof is vertically aligned in filter compartment 22 and received by mounting stud 55 of filter 40, concentrically therein (FIGS. 7 and 10).

Figure 11:
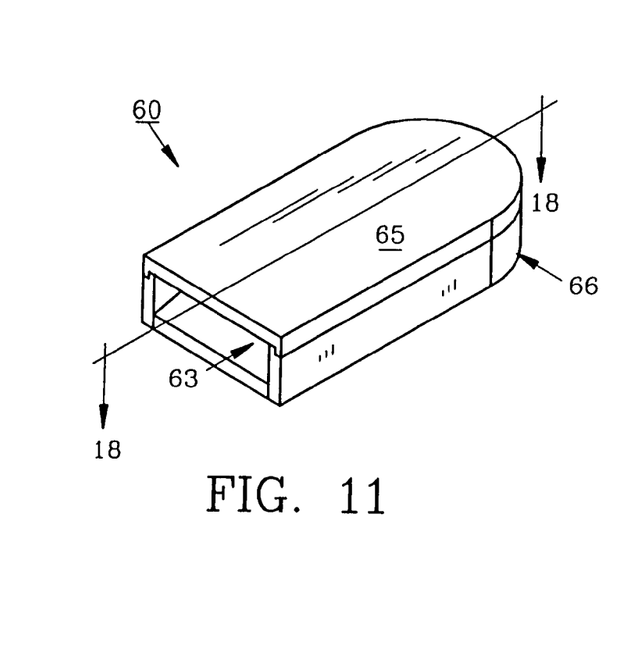
FIG. 11 demonstrates a top right side perspective view of the preferred air infuser of the invention.
Figure 12:
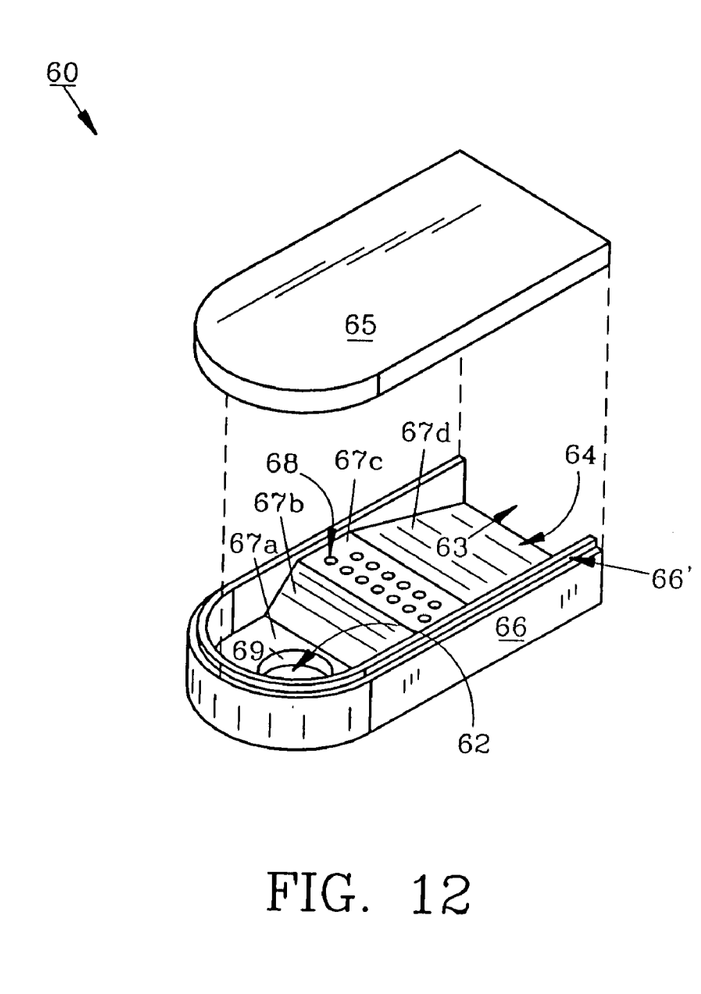
FIG. 12 shows the air infuser of FIG. 11 with the cap exploded therefrom.
Figure 13:
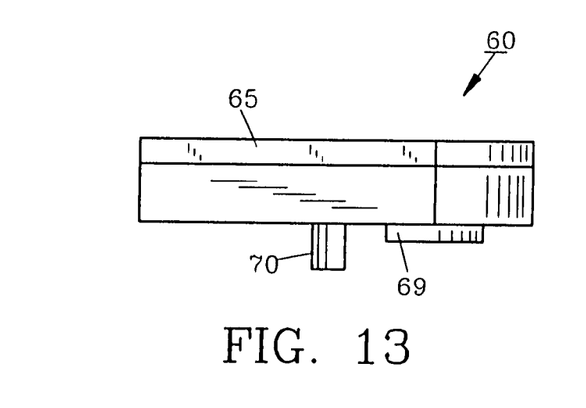
FIG. 13 illustrates a left side elevational view of the infuser shown in FIG. 11, the right side elevational view being a mirror image thereof.
Figure 14:
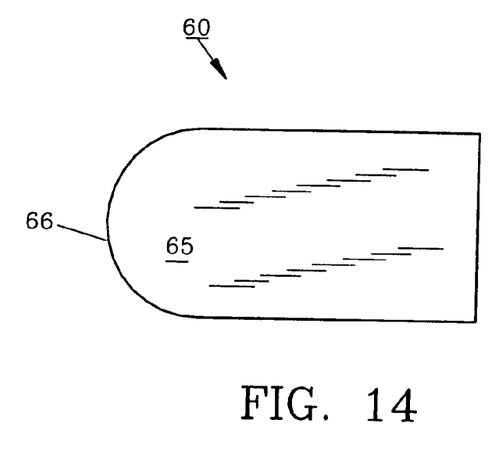
FIG. 14 demonstrates a top plan view of the infuser as shown in FIG. 11.
Figure 15:
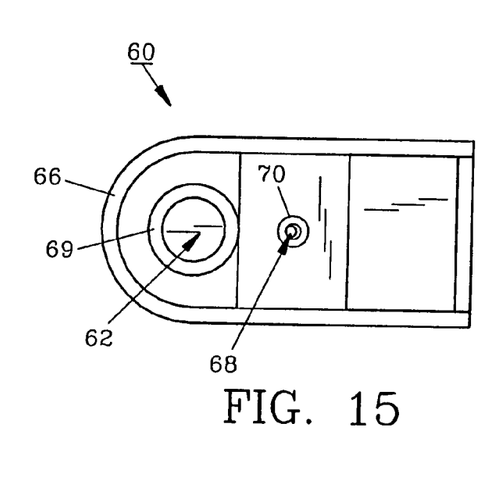
FIG. 15 shows a bottom plan view of the infuser shown in FIG. 11.
Figure 16:
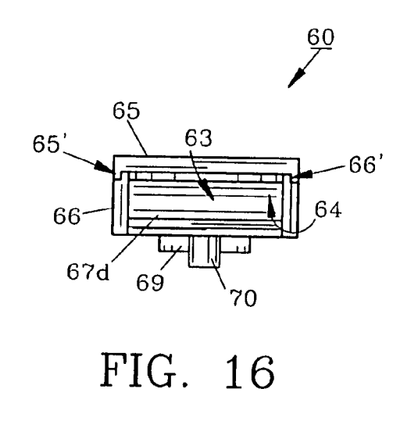
FIG. 16 features a rear view of the air infuser shown in FIG. 11.
Figure 17:
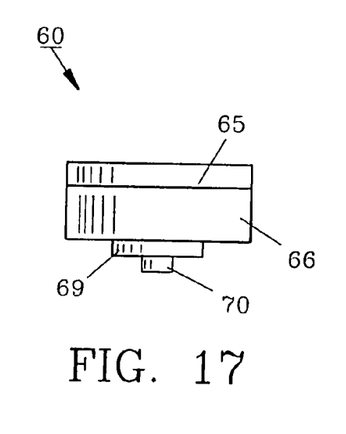
FIG. 17 illustrates a front view of the infuser seen in FIG. 11.
Figure 18:
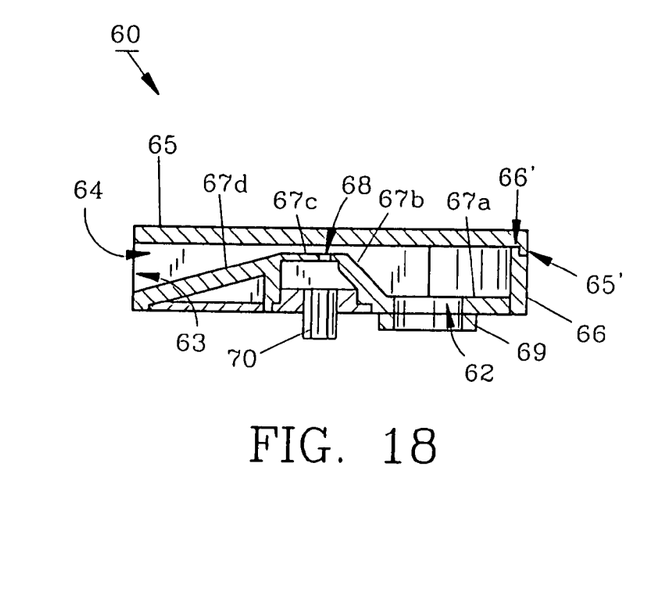
FIG. 18 pictures a cross-sectional view of the air infuser as along lines 18—18 of FIG. 13.

In FIGS. 11–18 various views of air infuser 60 are shown as removed from fish compartment 21. Air infuser 60 is formed from a standard rigid polymeric material and comprises cap 65 joined to U-shaped body 66 as seen in FIGS. 11 and 17. Body 66 defines internal channel 64 with ingress 62 and egress 63 positioned normal to one another at different ends of channel 64 (FIG. 18). Body 66 includes segmented path 67 therein and is covered by planar cap 65 (FIG. 14) with channel 64 therebetween. Body 66 and cap 65 each define opposing offset mating edges 66' and 65' seen in FIG. 16 respectively for aligning and creating a greater contact surface. U-shaped body 66 defines rectangular egress 63 at the open end between cap 65 and segmented path 67 to allow oxygenated water to flow therefrom. Segmented path 67 shown in FIG. 12, comprises four (4) segments, 67a, 67b, 67c and 67d joined in succession as by integrally molding. In FIG. 18, first segment 67a is offset from third segment 67c while both are parallel to and remain spaced from cap 65. Second segment 67b extends towards cap 65 while fourth segment 67d extends from cap 65. In FIG. 15, body 66 further comprises linear water conduit 69 depending from first segment 67a, with ingress 62 contained therein. Water conduit 69 is substantially normal to cap 65 and is positioned in second aperture 34 (FIG. 3) for receiving water under pressure from pump apparatus 80. Third segment 67c defines a plurality of coplanar bores 68 as seen in FIG. 12. Each bore 68 is in communication with air conduit 70 which depends from third segment 67c, seen in FIG. 18. Air conduit 70, which is substantially parallel to water conduit 69 (FIG. 13), is positioned in third aperture 35 and receives tube 71. The shape of channel 64 creates a pressure gradient between the water directed into air infuser 60 through ingress 62 and the water directed therefrom through egress 63. Oxygen is thus drawn from tube 71 through each bore 68 of third segment 67c by venturi action. The oxygen enriched water is directed from air infuser 60 through egress 63 in a direction parallel to base 23' and along wall 32 for reducing fish injuries by creating a current in fish compartment 21. The fish hence swim in one direction and avoid collisions with each other. The venturi action also creates gas bubbles (not shown) that aid in the removal of harmful gases within fish compartment 21 as the bubbles float to the surface.

The method of maintaining healthy bait fish follows the physical elements of fish bait system 10 and comprises: filling dual compartment tank 20 with sufficient water; activating pump apparatus 80 to direct water from filter compartment 22 into air infuser 60; enriching the water with oxygen; directing oxygenated water from air infuser 60 into fish compartment 21; displacing the water from fish compartment 21 through backflow cover 52, L-shaped pipe 56 and into filter 40; removing debris from the water; expelling filtered water from filter 40 into filter compartment 22; and directing filtered water into fish compartment 21 with pump apparatus 80 for recirculation in fish bait system 10. Fish as desired are added to bait system 10 after water has been circulated and oxygenated.

The illustrations and examples provided herein are for explanatory purposes and are not intended to limit the scope of the appended claims.

We claim:

1. A fish bait system comprising: a tank, said tank defining a fish compartment and a filter compartment, a wall, said wall separating said fish compartment from said filter compartment, said wall defining a first aperture and a second aperture, a water filter housing, said water filter housing vertically contained within said filter compartment, said water filter housing comprising a front, a back, and a bottom, said front joined to said back, said water filter housing defining a sediment chamber along said front and spaced from said back, said water filter housing in communication with said fish compartment through said first aperture, filter media located inside said water filter housing and extending in a vertical plane between said front and back, a hollow mounting stud having a first end portion extending into said water filter housing through and above said bottom and a second end portion which is in communication with said first aperture, said first end portion of said hollow mounting stud extending between said filter media and said front such that an entirety of said filter media is laterally spaced from said first end portion of said hollow mounting stud, a pump apparatus, said pump apparatus positioned in said second aperture, a means to infuse oxygen into water, said infusion means positioned in said fish compartment and in communication with said pump apparatus through said second aperture whereby said pump apparatus can direct filtered water infused with oxygen into said fish compartment.

2. The fish bait system of claim 1 wherein said infusion means comprises a body, said body defining an ingress, a channel, and an egress, said channel positioned between said ingress and said egress, said ingress contiguous said second aperture, said egress in communication with said fish compartment, a tube, said tube joined to said body and in communication with said channel, said tube for delivering oxygen to said channel.

3. The fish bait system of claim 2 wherein said channel comprises a tapered inlet section, a linear central section, and a flared outlet section, said central section positioned between and narrower than both said inlet and said outlet sections, said inlet section tapering to said central section, said outlet section flaring from said central section, said ingress contained in said inlet section, said egress contained in said outlet section, said body further defining a bore, said bore positioned between said tube and said central section whereby said tube can supply oxygen to said central section through said bore.

4. The fish bait system of claim 2 wherein said infusion means body further defines a plurality of bores, each of said bores positioned between said channel and said tube whereby said tube can supply oxygen to said channel through said bores.

5. The fish bait system of claim 2 wherein said body further defines an air conduit, said air conduit in communication with said channel, said tank wall further defining a third aperture, said air conduit received in said third aperture, said air conduit receiving said tube.

6. The fish bait system of claim 2 wherein said ingress is normal to said egress.

7. The fish bait system of claim 1 further comprising filter media, said filter media contained within said water filter housing contiguous said back.

8. The fish bait system of claim 7 wherein said front defines a water inlet and said back defines a water outlet.

9. The fish bait system of claim 8 wherein said back defines a sinusoidal surface with a series of peaks contiguous said filter media.

\* \* \* \* \*